March 9, 1971     R. P. MOORE ET AL     3,568,229

SCREW-WASHER ASSEMBLY APPARATUS

Filed April 7, 1969     6 Sheets-Sheet 1

INVENTORS
ROBERT P. MOORE
BURDETTE R. STEADMAN

BY Hood, Gust, Irish & Lundy
ATTORNEYS

INVENTORS
ROBERT P. MOORE
BURDETTE R. STEADMAN

BY
Hood, Gust, Irish & Lundy
ATTORNEYS

March 9, 1971  R. P. MOORE ET AL  3,568,229
SCREW-WASHER ASSEMBLY APPARATUS
Filed April 7, 1969  6 Sheets-Sheet 4

INVENTORS
ROBERT P. MOORE
BURDETTE R. STEADMAN
BY *Hood, Gust, Irish & Lundy*
ATTORNEYS March 9, 1971  R. P. MOORE ET AL  3,568,229
SCREW-WASHER ASSEMBLY APPARATUS
Filed April 7, 1969  6 Sheets-Sheet 6

INVENTORS
ROBERT P. MOORE
BURDETTE R. STEADMAN

BY
Hood, Gust, Irish & Lundy
ATTORNEYS

United States Patent Office 3,568,229
Patented Mar. 9, 1971

3,568,229
SCREW-WASHER ASSEMBLY APPARATUS
Robert P. Moore and Burdette R. Steadman, Indianapolis, Ind., assignors to Moorfeed Corporation, Indianapolis, Ind.
Filed Apr. 7, 1969, Ser. No. 814,060
Int. Cl. B21h 3/02; B23g 9/00, 19/08
U.S. Cl. 10—2
22 Claims

ABSTRACT OF THE DISCLOSURE

An apparatus for mating and assembling screw blanks and washers comprising vibratory-type feeder means and thread forming means. The feeder means is arranged to mate screw blanks with washers and to feed the mated blanks and washers to the forming means. In one embodiment, a pair of such feeder means is operatively connected to a thread forming means by a track mechanism which alternately feeds the outputs of the pair of the forming means. In another embodiment, the feeder means comprises a first feeder bowl for feeding screw blanks, a second feeder bowl for feeding washers, first track means for receiving screw blanks from said first bowl, and second track means for receiving washers from said second bowl, the track means being arranged so that screw blanks leaving the exit end of the first track means will mate with washers on the second track means. In other embodiments, the feeder bowls and track means are mounted for adjustable movement to accommodate screw blanks and washers of different size. Further, in some embodiments each bowl and track means is constructed so that it can be easily modified or adjusted to accommodate screw blanks and washers of different size.

---

The present invention relates to the feeding of properly oriented elements to a processing apparatus, and more particularly to the feeding of mated screw blanks and washers to a thread forming or a thread rolling apparatus where a thread is formed on each screw blank, thereby to secure the washer mated with the screw blank against the head of the screw blank.

Thread rolling apparatus are well known. Such apparatus are available which will rapidly form threads on screw blanks. The present invention is directed toward the problem of feeding properly oriented screw blanks to such a thread rolling apparatus and at a feed rate which is substantially equivalent to the capacity of the thread rolling apparatus.

A primary object of the present invention is to provide means for feeding mated screw blanks and washers to such a thread rolling apparatus, which feeding means is constructed and arranged so that it can be easily modified or adjusted to accommodate screw blanks and washers of different sizes. This aspect of the present invention solves a long-standing problem in the thread forming business. That is, it is economically unfeasible to provide feeder means for feeding each size or type of screw blank and washer at a rate which is substantially the equivalent of the rate of the thread rolling apparatus. The present invention provides feeder means which will feed screw blanks and washers having a wide range of sizes and at a feed rate which is substantially equivalent to the rate at which the thread forming apparatus will operate.

One object of the present invention is to provide an assembly apparatus comprising frame means, a first feeder bowl for feeding first elements such as screw blanks, a second feeder bowl for feeding second elements such as washers, a first track means for receiving and conveying first elements from the first feeder bowl and second track means for receiving and conveying second elements from the second feeder bowl. The track means of this apparatus are arranged so that first elements leaving the exit end of the first track means will drop into mating engagement with second elements carried on the second track means. In order to accommodate elements of different size, means are preferably provided for mounting each of the bowls and each of the track means for adjustable movement. Preferably, each of the bowls is mounted for adjustable movement vertically and each of the track means is mounted for adjustable movement vertically, adjustable movement pivotally about a horizontal axis and adjustable movement in the direction of the track means.

Another object of the present invention is to provide an assembly apparatus of the type comprising a pair of feeder bowls feeding, respectively, a pair of track means, in which each of the track means includes a rectilinear track portion and means for vibrating the track portion to cause movement of parts therealong.

Still another object of the present invention is to provide a feeder bowl structure which is ideally suited for the feeding of headed and shanked elements such as screws, rivets, nails and the like, which bowl comprises a slightly domed bottom and a series of at least two part circular tracks for carrying parts upwardly from the bottom of the bowl. The tracks which are part circular are connected by a straight track which is tangentially related to the smaller and lower of the two tracks.

A further object of the present invention is to provide a feeder bowl structure which is ideally suited for feeding headed parts, the bowl structure including a peripherally extending track which is inclined downwardly from its radially inner edge to its radially outer edge and a peripherally extending skirt disposed above the track so that its lower peripherally extending edge will engage the heads of parts moving on the track whereby the shanks of the parts will extend radially outwardly under the skirt. The advantages of this concept will be better appreciated as this description progresses. In accordance with this invention, this skirt is mounted for adjustable movement relative to the track to accommodate headed parts of different sizes.

Another object of the present invention is to provide an assembly apparatus of the aforesaid type in which the bowls and the track means are adjustably mounted in which the feeder bowl for the headed parts includes the aforesaid adjustably mounted skirt.

Yet another object of the present invention is to provide a light-controlled indexing system or mechanism for assuring that a screw blank leaving an upper track means will mate with a washer on a lower track means. This mechanism momentarily holds a screw blank and releases it when a washer appears at a specific point on the lower track.

A further object of the present invention is to provide a cam-operated indexing mechanism for assuring that each screw blank leaving an upper track will mate with a washer on a lower track. This mechanism includes cam-driven fingers for holding and releasing each screw blank and each washer, the movement of the fingers being timed so that each screw blank, as it leaves the exit end of the upper track, will be disposed in vertical registry with a washer on the lower track.

Another object of the present invention is to provide first and second feeder means for feeding elements, such as mated screw blanks and washers, to a thread rolling apparatus, the first and second feeder means being connected to the thread rolling apparatus by a track mechanism which oscillates between the feeder means. Particularly, this arrangement contemplates first and second track means receiving elements, respectively, from the first and second feeder means and a third track means for receiving elements from the first and second track means and conveying such elements to a thread rolling apparatus. Transfer means is provided for alternately connecting the exit ends of the first and second track means to the entrance end of the third track means.

Still a further object of the present invention is to provide a track means for movably supporting mated screw blanks and washers, which track means includes a plurality of parallel bars, at least some of which are mounted for adjustable movement relative to the others to accommodate screw blanks and washers of different size.

A further object of the present invention is to provide a track means for serially conveying mated screw, blanks and washers and means, at a point on the track means, for dropping out imperfectly mated screw blanks and washers.

Yet another object of the present invention is to provide a first feeder bowl for feeding screw blanks, a second feeder bowl for feeding washers, a first track for receiving and conveying screw blanks from the first feeder bowl, this first track being arcuately formed and generally concentrically mounted on the second bowl for vibratory movement therewith and a second track for receiving and conveying washers from the second bowl, this second track being mounted on the second bowl to be in vertical registry with the exit end of the first track so that screw blanks leaving this exit end will mate with washers on the second track.

Other objects and features of the present invention will be apparent as the description progresses.

To the accomplishment of the above and related objects, the present invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
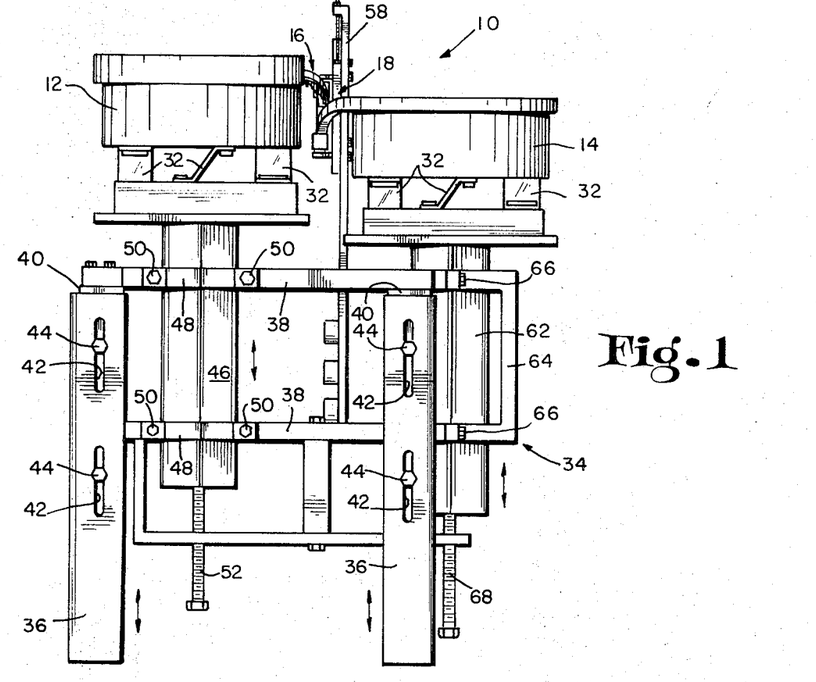
FIG. 1 is an elevational view of an apparatus for feeding and mating screw blanks and washers, which apparatus comprises a pair of bowls, each of which is mounted for adjustable movement, and a pair of inline feeders, each of which is mounted for adjustable movement.
Figure 2:
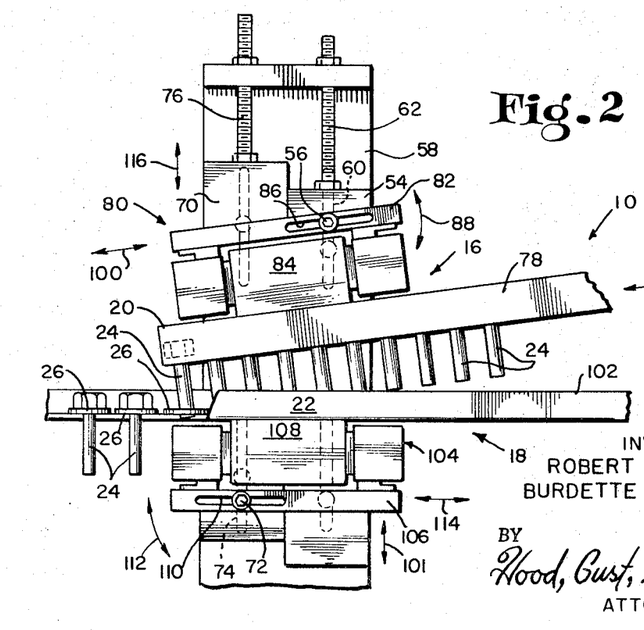
FIG. 2 is a fragmentary view, greatly enlarged, of the two inline feeders comprising the apparatus of FIG. 1.

Referring now to FIGS. 1 and 2, it will be seen that there is illustrated a feeder means 10, i.e., an apparatus for feeding mated screw blanks and washers, comprising a feeder bowl 12 arranged to feed the screw blanks and a feeder bowl 14 arranged to feed the washers. First track means 16 is provided for receiving and conveying the screw blanks away from the bowl 12 and second track means 18 is provided for receiving and conveying the washers away from the bowl 14. As clearly illustrated in FIG. 2, the exit end 20 of the first track means 16 is disposed above a portion 22 of the second track means 18 so that screw blanks 24 leaving the exit end 20 will mate with washers 26 carried on the second track means 18. Specifically, the screw blanks 24, which are supported by their heads on the first track means 16, drop from the exit end 20 into mating engagement with the washers 26. As a screw blank approaches the exit end 20 in the direction of the arrow 28, its shank portion engages and extends into the central opening of a washer 26 which is moving as indicated by the arrow 30 on the second track means 18. Thus, when the screw blank leaves the exit end 20, since its shank portion is already extending into the opening of a washer 26, the screw blank merely drops until its head rests on the washer. The first track means 16 must, therefore, be provided with a slot through which the shank portions of the screw blanks 24 extend and the second track means 18 must also be provided with a slot through which the shank portions of the screw blanks can extend. Thus, as it moves along the first track means 16, each screw blank 24 is supported by diametrically opposite portions of its head so that its shank portion can extend downwardly and each washer 26 is supported by the track means 18 at diametrically opposite points so that the shank of a screw blank can extend through its center opening.

Feeder bowls or vibratory feeders or hoppers and the theory by which they feed and orient articles, such as screws and washers, are well known and need not be discussed, in detail, in this description. See the Balsiger et al. Pat. 2,609,914, issued Sept. 9, 1952. See also the Smith Pat. 2,901,095, issued Aug. 25, 1959 and the Boris Pat. 3,114,448, issued Dec. 17, 1963. Conventionally, these feeders include a hopper bowl which is mounted on springs and an electromagnetic vibratory motor is provided to vibrate the bowl.

The bowls 12 and 14 are supported on springs 32 as illustrated.

The feeder means 10 comprises frame means 34 which is preferably mounted on four vertically extensible legs 36, only two of which are shown in FIG. 1. Specifically, the frame means 34 comprises a rigid frame 38 which is carried on four vertically extending members 40, each of which is the telescoping member of a vertically extending leg 36. As illustrated, the outer member of each leg 36 is provided with vertically elongated slots 42 and the position of its telescoping member 40 is adjusted by loosening and tightening the bolts 44 which extend through the slots to engage the member 40. Conventionally, as illustrated, the heads of the bolts 44 bridge across the slots 42 so that, when the bolts are threaded into the members 40 and tightened, the members are secured. The purpose of the adjustably extensible legs 36, of course, is to provide means for selecting the height at which mated screw blanks and washers will be fed by the feeder means 10.

First means is provided for supporting the bowl 12 for adjustable movement on the frame means 34 and second means is provided for supporting the first track means 16 for adjustable movement on the frame means. In the illustrative embodiment, the first supporting means includes a first support member 46 on which the first bowl 12 is mounted, the first support member being mounted for generally vertical reciprocation on the frame means 34, and first means 48 for clamping the first support member 46 in a selected vertical position. The clamping means 48 are secured to the frame 38 by means such as the bolts 50. The vertical position of the bowl 12 may be changed by loosening the clamping means 48 and then raising and lowering the support member 46 by adjusting the jacking means 52 which, in the illustrative embodiment, is a screw jack.

The aforesaid second support means, i.e., the means for supporting the first track means 16, includes a second support member 54 on which the first track means is mounted, the second support member being mounted for generally vertical reciprocation on the frame means 34, and second means, such as the bolt 56, for clamping the second member 54 in a selected vertical position. In the illustrative embodiment, the frame means 34 provides a vertically extending plate member 58 against which the support member 54 is clamped. Specifically, this plate member 58 is provided with a vertically elongated slot 60 through which the bolt 56 extends. A jacking screw 62 is provided for conveniently raising and lowering the support member 54.

Third means for supporting the second bowl 14 for adjustable movement vertically is provided, this third means comprising a third support member 62 on which the second bowl is mounted, the third support member being mounted for generally vertical reciprocation on the frame means 34, and third means 64 for clamping the third support member in a selected vertical position. The clamping means 64 conventionally utilizes the illustrated bolts 66. Further, a jacking screw 68 is provided for conveniently raising and lowering the member 62 to adjust the position of the bowl 14.

Fourth means is provided for supporting the second track means 18 for adjustable movement on the frame means 34, the fourth supporting means including a fourth support member 70 on which the second track means 18 is mounted, this fourth member being mounted for generally vertical reciprocation on the frame means 34, and fourth means, such as the bolt 72, for clamping the fourth member 70 in a selected vertical position. The bolt 72 extends through a slot 74 in the plate member 58. The support member 70 is mounted against the same surface of the plate member 58 as the support member 54. A jacking screw 76 is provided for conveniently raising and lowering the support member 70.

The surface of the plate member 58 against which the members 54 and 70 are clamped is flat and the exit end portion of the first track means 16 and the portion of the second track means 18 therebelow are parallel to this flat surface of the member 58. In order for the screw blanks 24 to mate with the washers 26, the exit end portion of the first track means 16 must be in vertical registry with the portion of the second track means 18 disposed therebelow.

In the illustrative and preferred embodiment, the track means 16 comprises a rigid and rectilinear track portion 78 providing the exit end 20 and means, indicated generally at 80, for vibrating the track portion 78 to move the screw blanks 24 therealong. The vibrating means 80 may be a conventional inline feeder, the operation of which is analogous to the operation of the feeder bowls discussed previously. That is, a track is resiliently supported and means is provided for vibrating the track so that parts carried thereon will move in one direction therealong. The vibrating means 80 comprises a base member 82 and a driven member 84 to which the track portion 78 is securely connected, the base member 82 having an elongated slot 86 formed therein as illustrated. The vibrating means 80 is connected to the support member 54 by the bolt 56 which extends through the slot 86 as illustrated. This elongated slot 86 and the bolt 56 are such that the track means 16 is mounted on the support member 54 for adjustable movement pivotally about a horizontal axis as indicated by the arrow 88 and rectilinearly in the direction of the slot as indicated by the arrow 100. Thus, the track portion 78 of the track means 16 can be adjusted pivotally about a horizontal axis as indicated by the arrow 88, longitudinally in the direction of extension of the track portion as indicated by the arrow 100 and vertically as indicated by the arrow 101.

Similarly, the track means 18 comprises a rigid rectilinear track portion 102 and means, indicated at 104, for vibrating the track portion. The vibrating means 104 may be another conventional inline feeder having a base member 106 and a driven member 108 on which the track portion 102 is mounted, the base member 106 having a longitudinally extending elongated slot 110 as illustrated. The track means 18 is mounted on the support member 70 by means of the bolt 72 which extends through the elongated slot 110. The bolt 72 and slot 110 arrangement also permits the track portion 102 to be adjusted pivotally about a horizontal axis as indicated by the arrow 112 and longitudinally in the direction of extension of the track portion 102 as indicated by the arrow 114. By using the jacking screw 76, the track portion 102 can be adjusted vertically as indicated by the arrow 116.

It will be appreciated that, if the feeder means 10 is set up to feed screw blanks 24 having shank portions of one length and if it is required then to feed screw blanks having shank portions of a significantly different length, at least the vertical position of the bowl 12 and the vertical position of the track means 16 will have to be changed. It has been found that, in such a case, not only does the vertical position of the track means 16 have to be changed, the angle between the track portion 78 and the track portion 102 also has to be changed.

The present invention as illustrated in FIGS. 1 and 2 contemplates the provision of standard gauges for setting up the adjustments of the feeder means 10. That is, for any given combination of screw blanks 24 and washers 26, a set of gauges can be provided for establishing proper adjustments.

Referring now to FIGS. 3–7, a feeder bowl or hopper bowl 120 which is particularly suitable for feeding headed parts, such as screw blanks, will be discussed. In the illustrative embodiment, this hopper bowl 120 comprises a circular base 122 about which is disposed a peripherally extending wall 124, the base and wall providing the foundation for the hopper bowl. A slightly conical bottom 126 is provided for receiving the headed parts which are dumped into the bowl 120. While the bottom 126 is illustrated as being slightly conical, it will be appreciated that the bottom may be slightly spherically domed. Thus, in this description and in the claims appended hereto, the terms "slightly domed" or "slightly conical" are intended to mean that the bottom is raised at the center and slopes downwardly from the center. The reason for this, of course, is to cause the parts to tend to move radially outwardly on the bottom 126.

Figures 3, 4, 5, 6, 7:
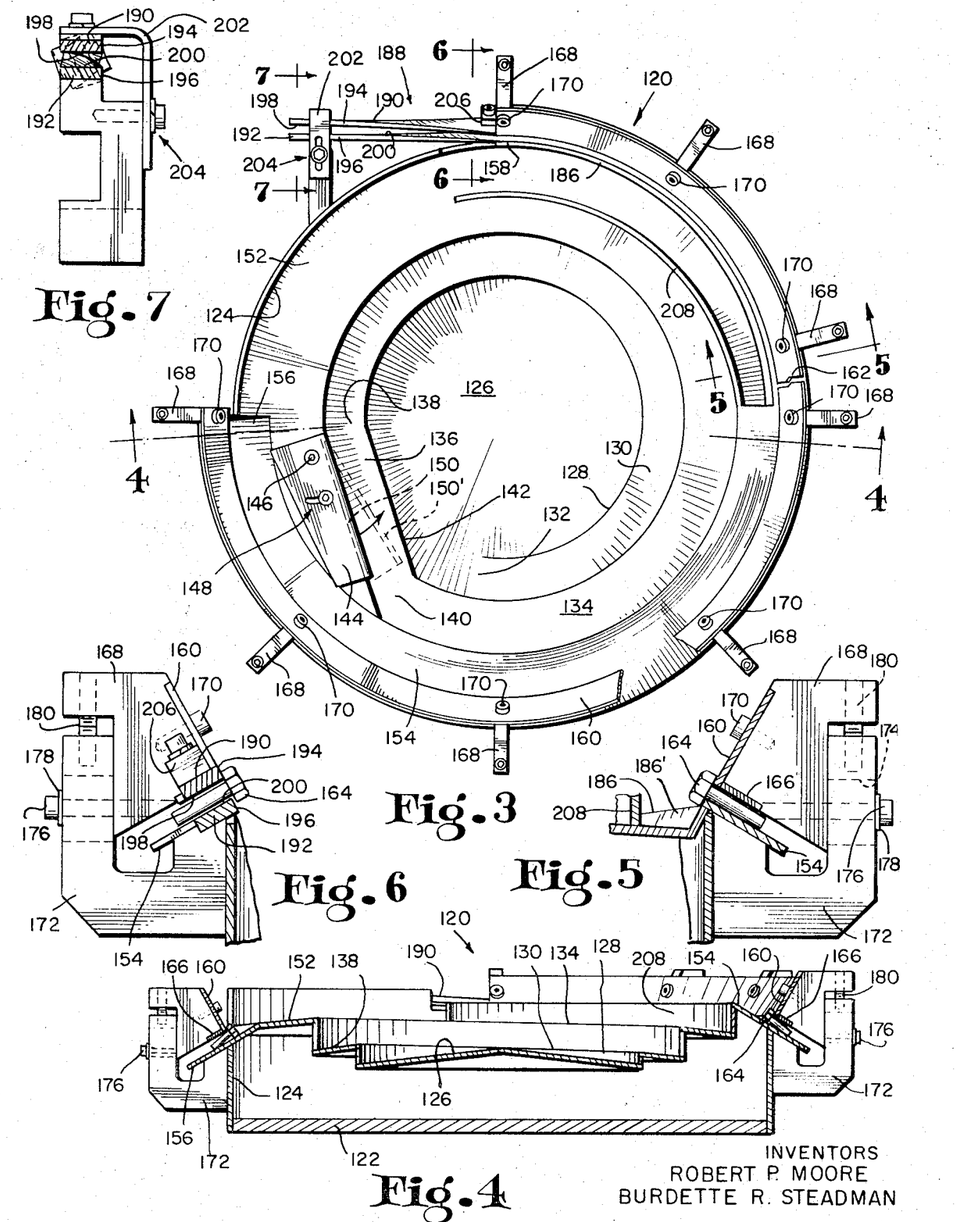
FIG. 3 is a plan view, partially sectioned, of a feeder bowl which is ideally suited for feeding headed parts.
FIG. 4 is a sectional view taken from FIG. 3 generally along the line 4—4.
FIG. 5 is an enlarged, fragmentary sectional view taken from FIG. 3 generally along the line 5—5.
FIG. 6 is an enlarged, fragmentary sectional view taken from FIG. 3 generally along the line 6—6.
FIG. 7 is another enlarged, fragmentary sectional view taken from FIG. 3 generally along the line 7—7.

The bottom 126 is generally circular as viewed in the plan view of FIG. 3 in that its outer edge 128 is circular and extends about 270°. That is, the bottom 126 may be formed from a plate which is circular at least 270° about its periphery. A first part circular track 130 inclines upwardly about a major portion of the periphery of the bottom 126, the lower end of the first track 130 merging with the bottom at the point 132 to receive parts therefrom. The track 130 extends peripherally about approximately 270° of the outer peripheral edge of the bottom 126. A second part circular track 134 inclines upwardly about the periphery of the first track 130 and a third straight track 136 is provided, this straight track having one end merging with the upper end of the first track 130 as indicated at 138 and its other end merging with the lower end of the second track 134 as indicated at 140. The radially inwardly facing edge 142 of the third track 136 is generally tangential with the bottom 126 at the point 138. This tangentially extending straight track 136 provides a crossover from the first part circular track 130 to the second part circular track 134. That is, parts move onto the lower end of the track 130 at the merging point 132 and then move circularly about the track to the point 138, from which point the parts move generally straight to the merging point 140. The generally straight track 136 may or may not incline upwardly from its end 138 to the end 140. Of course, the first track 130 and the second track 134 are provided for conveying the parts upwardly from the bottom 126 to the upper periphery of the hopper bowl 120.

The circular tracks 130 and 134 are an improvement over prior art tracks which incline spirally upwardly from the bottom of the bowl, primarily because the circular tracks are easier to fabricate than the spirally inclining tracks. That is, it is quite difficult to fabricate a track which inclines upwardly and spirally from the bottom of the bowl. It has been found that the use of the straight track portion 136 to move the parts from one radius on the bowl to a greater radius, i.e., from a track having a smaller diameter to a track having a larger diameter, works satisfactorily. This straight track 136 also provides an ideal point for metering or determining the number of parts moving from the track 130 to the track 134. Thus, a metering gate 144 is mounted on the hopper bowl 120 to be adjustably movable outwardly into the path of parts moving along the straight track 136. Specifically, in the illustrative embodiment, the metering gate 144 is mounted for adjustable movement pivotally about a vertical axis as indicated at 146 and means, indicated generally by the reference numeral 148, is provided for rigidly fastening the gate in a selected position. The gate 144 is provided with a downwardly extending flange 150 which is effective to direct parts from the track 136 back onto the bottom 126. When the flange is moved to its position indicated at 150', only one part at a time can move past the flange. The flange may be positioned at any point between its two illustrated positions to provide the desired feeding rate of parts.

As best seen in the sectional view of FIG. 4, each of the tracks 130, 134 inclines slightly downwardly from its radially inner edge to its radially outer edge. That is, a radially extending plane section taken at any point on either of the tracks 130, 134 will show that the radially inner edge of the track is slightly higher than the radially outer edge of the track. This inclination from the radially inner edge to the radially outer edge tends to cause the parts to move radially outwardly on the track.

The upper end portion 152 of the second track 134 provides a relatively large collecting area for parts which move up the track. This portion 152, of course, inclines downwardly from its radially inner edge to its radially outer edge so that the parts will tend to move radially outwardly toward the outer wall 124 of the hopper bowl 120. Parts leaving this track portion 152 move on to a fourth part circular track 154 which, in the illustrative embodiment, extends about a major portion (approximately 270°) of the bowl 120. The entry end 156 of the track 154 receives parts from the track portion 152. As seen in FIG. 4, the second track 134 inclines downwardly at a first degree from its radially inner edge to its radially outer edge and the fourth track 154 inclines downwardly at a second and substantially greater degree from its radially inner edge to its radially outer edge. Thus, parts which move from the track portion 152 on to the entry end 156 tend rapidly to move radially outwardly on the track 154.

The track 154 inclines upwardly from its entry end 156 to its exit end 158.

In accordance with the present invention, skirt means is disposed peripherally about a portion (approximately 270° in the illustrative embodiment) of the bowl 120, the skirt means providing a lower, peripherally extending edge spaced above at least a portion of the track 154 and disposed radially inwardly from the outer edge of the track. This lower edge engages the heads of parts moving on the track 154 so that the shanks of the parts will extend radially outwardly on the track. In the illustrative embodiment, a skirt 160, which may or may not be broken into two parts as indicated at 162, extends peripherally about approximately three-fourths of the bowl 120 and above the fourth track 154, this skirt inclining downwardly from its radially outer edge to its radially inner edge as best seen in the sectional views of FIGS. 4, 5 and 6. The distance between the radially inner edge of the skirt 160, i.e., the lower peripherally extending edge of the skirt, and the upper surface of the fourth track 154 is such that, when headed parts such as screws, bolts and the like are fed onto the track 154, the heads of such parts are engaged and supported by the inner edge of the skirt 160 while the shanks of such parts extend radially outwardly under the skirt edge and against the fourth track. Such a headed part is indicated by the reference numeral 164 in FIGS. 4, 5 and 6.

The arrangement of the skirt 160 above the track 154 which inclines downwardly from its radially inner edge to its radially outer edge at, for instance, approximately 30° permits a greater quantity of headed parts to be movably supported on the track. That is, since the skirt is provided for engaging the heads of the headed parts so that the shanks of such parts will extend radially outwardly, the width of the heads of such parts determines the spacing of the parts on the track. The skirt orients the parts so that their shank portions extend radially outwardly and so that the peripheral space on the track 154 utilized by each part will be equal to the width of the head of the part. In prior art feeders, headed parts, such as screw blanks, have been fed in such a manner that the peripheral space on the track is greatly used by the length of the shanks of the parts. This, of course, is one factor determining the feed rate of a particular feeder means.

Preferably, a flange 166 is disposed about the lower, inner edge of the skirt 160, this flange 166 inclining downwardly from its radially inner edge to its radially outer edge and at about the same degree as the inclination of the fourth track 154. This flange 166 cooperates with the track 154 to provide a walled slot for receiving the shanks of the headed parts.

Preferably, means is provided for supporting the skirt 160 for adjustable movement relative to the fourth track 154, whereby the distance between the lower edge of the skirt and the fourth track can be selected to accommodate parts having different size heads and shanks. In the illustrative embodiment, the skirt 160 is fastened to a plurality of brackets 168 by means such as the illustrated screws 170, each of the brackets being mounted for adjustable movement vertically on a support 172. It will be appreciated that the screws 170 are merely illustrative and that the skirt 160 may be welded or otherwise securely fastened to the brackets 168.

Each of the support members 172 is welded or otherwise securely fastened to the outer surface of the wall 124 of the bowl 120. Each of these members 172 is provided with a vertically elongated slot 174 (best seen in FIGS. 5 and 6) through which a screw 176 extends. Each of these screws 176 is threadedly engaged with the bracket 168 mounted on the support member 172 through which the screw extends. A washer 178 is provided with each screw 176, the washer bridging across the slot through which the screw extends in a conventional manner. The brackets 168 are, therefore, adjustably movable when the screws 176 are loosened. In the illustrative embodiment, a jacking screw 180 is provided for adjusting each bracket 168 on its support member 172.

In the illustrative embodiment, approximately the last 90° portion of the track 154 is provided with a peripherally extending ledge 186 terminating at the exit end 158 of the track, this ledge providing a radially inwardly and upwardly facing edge surface 186′ best seen in FIG. 5. The lower edge of the skirt 160 is disposed above and generally in registry with this ledge 186. The lower edge of the skirt 160 and the ledge 186 are vertically spaced apart to engage diametrically opposite portions of the heads of the parts such as indicated at 164. That is, the parts 164 move onto the track 154 at its entrance end 156 and for the first 180° portion of the track, the heads of the parts are engaged by the lower edge of the skirt 160. When the parts move onto the last 90° portion of the track, the heads of the parts 164 are engaged at diametrically opposite portions, respectively, by the edge surface 186′ and the lower edge portion of the skirt 160.

Another track means, indicated generally by the reference numeral 188, is provided for receiving the parts from the exit end of the track 154, this track means including a pair of bars 190, 192, each of which has an upper edge 194, 196 and a side surface 198, 200 as illustrated. Each of the bars 190, 192 is twisted so that, when the bars are disposed side by side and spaced apart, the space between the facing side surfaces 198, 200 will provide a progressively inclining slot for receiving the shanks of the parts 164 and so that the upper edges 194, 196 of the bars 190, 192 will engage diametrically opposite portions of the heads of such parts.

The bars 190, 192 are twisted so that the side surfaces 198, 200 at the ends of the bars adjacent the exit end 158 of the track 154 are inclined downwardly and outwardly at substantially the same angle as the track and so that the side surfaces progressively incline downwardly to the point where they are substantially vertical and so that, at such a point, the parts 164 are supported by diametrically opposite portions of their heads resting, respectively, on the upper edges 194, 196. That is, the shanks of the parts 164 entering the track means 188 extend radially outwardly and downwardly at substantially the same angle as the angle of inclination of the track 154 at its exit end. The bars 190, 192 are twisted so that the shanks of the parts will swing downwardly to a vertical position as the parts approach the exit end of the track means 188.

Means are provided for supporting the bar 190 for movement toward and away from the other bar 192, thereby to accommodate parts of different size. In the illustrative embodiment, the supporting means for the bar 190 includes a bracket 202 which is supported for adjustable movement by means such as the screw and slot arrangement indicated at 204 and another bracket 206 which is connected to the support bracket 168 at the end of the skirt 160 which is adjacent the exit end 158 of the track 154. The right-hand end of the bar 190 moves substantially vertically with the bracket 168 to which it is connected and the left-hand end of the bar moves substantially horizontally with the bracket 202.

The bars 190, 192 may be flat, metallic bars which are twisted as illustrated.

In the illustrative embodiment, a fence 208 is disposed radially inwardly from the portion of the track 154 which is provided with the ledge 186. This fence 208 directs parts 164 which are not properly oriented with their shanks extending under the skirt 160 back to the portion 152 of the second track.

The hopper bowl 120 is ideally suited for use with the feeder means 10 of FIGS. 1 and 2. That is, the hopper bowl 12 of the feeder means 10 may have a structure corresponding to the structure of the hopper bowl 120 shown in FIGS. 3–7.

Figures 8, 9:
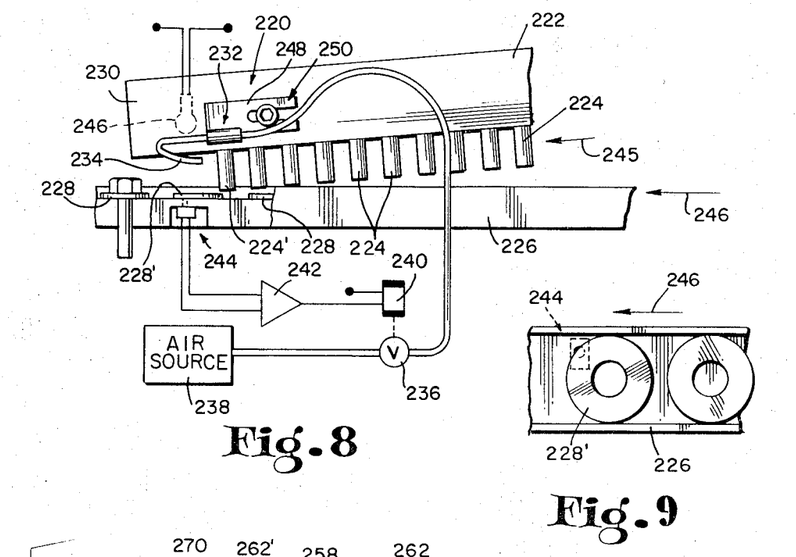
FIG. 8 is a somewhat diagrammatical view showing the light-controlled indexing mechanism of the present invention.
FIG. 9 is a fragmentary sectional view, slightly enlarged, showing the positioning of the light-actuated device of the mechanism of FIG. 8.

Referring now to FIGS. 8 and 9, means for increasing the possibility that a screw blank leaving an upper track means will mate with a washer on a lower track means will be discussed. In FIGS. 8 and 9, there is illustrated an indexing mechanism 220 for use with a first track means 222 for serially conveying headed male elements 224 and a second track means 226 for serially conveying female elements 228. The track means 222 and 226 correspond, respectively, to the track means 16 and 18 of FIGS. 1 and 2. That is, each such male element 224 is proportioned and designed for mating engagement with any such female element 228 and the first track means 222 is provided with an exit end 230 disposed above and in registry with a portion of the second track means 226 so that male elements 224 leaving the exit end will be in mating relationship with female elements 228 carried on the second track means.

In accordance with the present invention, the mechanism 220 comprises means for momentarily and releasably holding each such male element 224 at a first location represented by the location of the male element 224′ adjacent the exit end 230 and means for sensing the appearance of each such female element 228 at a first position represented by the position of the female element 228′ on the second track means 226, the first position of the female element being disposed relative to the first location of the male element so that, when a male element is released from the first location, it will mate with a female element appearing at the first position at the time such a male element is so released. In the illustrative embodiment, the means for momentarily and releasably holding male elements includes means 232 for directing a jet of air upstream at such male elements. The jet directing means 232 includes a tube 234 which is connected through a valve 236 to an air source indicated at 238. The valve 236 is operated by a solenoid 240 which is controlled by a conventional amplifier 242. The means for sensing the appearance of a female element 228 at the said first position includes a light-actuated device 244 which is operatively connected to the amplifier 242. A light source 246 is arranged to direct light at the device 244. When a female element 228 moves into the said first position, the light directed at the device 244 is blocked. When the light directed at the device 244 is blocked, the device electrically changes state to cause the amplifier 242 to operate the solenoid 240 to close the valve 236. When the valve 236 is closed, the jet of air directed at the male element 224 is stopped to permit the male element to move in the direction of the arrow 245 to mate with a female element 228 moving in the direction of the arrow 246. In the illustration of FIG. 8, when the valve 236 is closed, the male element 224′ will move into engagement with the female element 228′.

In the illustrative embodiment, the tube 234 is supported by a bracket 248 which is mounted on the first track means 222 for adjustment by means such as the illustrated screw and slot arrangement 250.

The valve 236, solenoid 240, amplifier 242, light-actuated device 244 and light 246 are conventional devices and do not need to be discussed, in detail, in this description.

The indexing mechanism 220 is arranged so that each male element 224 is held momentarily at a fixed location until the female element 228 which is to be mated with the male element arrives at a fixed position. The mechanism 220 is ideally suited for use with washers which are small and light in weight. That is, it is difficult physically to hold or to stop the flow of light-weight washers in a track. This is especially true if the edges of the washers are serrated.

It will be appreciated that the indexing mechanism 220 may be used with the feeder means 10 of FIGS. 1 and 2.

Figure 10:
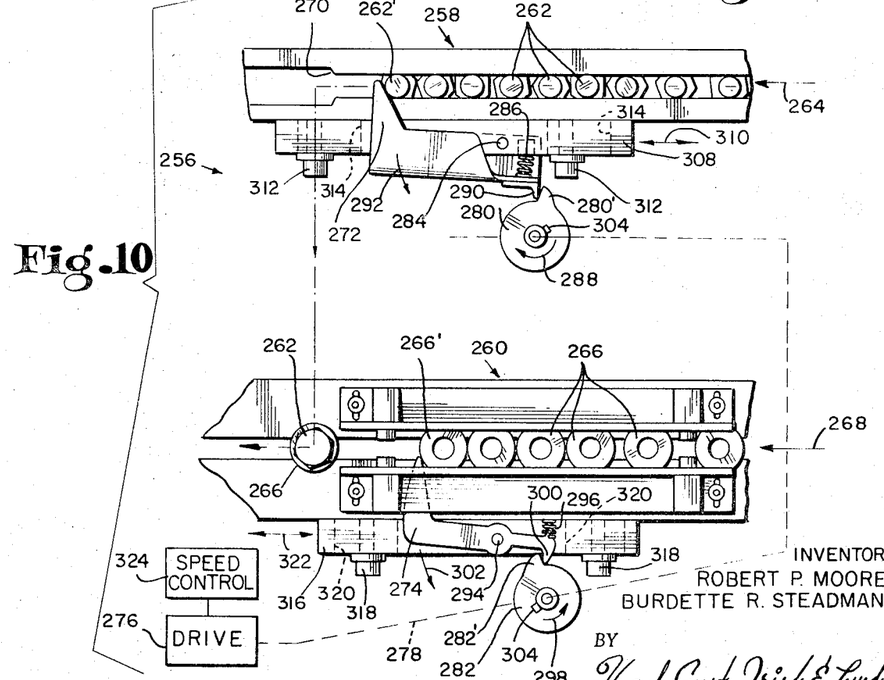
FIG. 10 is a somewhat diagrammatical view of the cam-operated indexing mechanism of the present invention.

Referring now to FIG. 10, an indexing mechanism, indicated generally by the reference numeral 256, for increasing the possibility that a male element leaving an upper track will be properly engaged with a female element on a lower track will be discussed. In FIG. 10, there is illustrated a bottom view of a first track means 258 and a top view of a second track means 260, the first track means being arranged serially to convey male elements 262 in the direction of the arrow 264 and the second track means being arranged serially to convey female elements 266 in the direction of the arrow 268. Again, the track means 258, 260 correspond to the track means 16, 18, respectively, in FIGS. 1 and 2. That is, male elements 262 leaving the exit end 270 of the track means 258 drop into mating engagement with female elements 266 on the second track means 260. The exit end 270 of the first track means 278 is disposed above and in registry with the second track means 260.

The mechanism 256 comprises first finger means 272 for momentarily holding each such male element 262 at a first location indicated by the position of the male element 262' adjacent the exit end 270 of the first track means and second finger means 274 for momentarily holding each such female element 266 at a first position represented by the position of the female element 266' on the second track means. This first position of the female element is disposed relative to the first location of the male element so that, when a male element is released from the said first location, it will mate with a female element which is released at a corresponding time from the said first position. Drive means including a drive motor 276 and a shaft 278 on which cams 280, 282 are mounted is provided for moving the finger means 272, 274, respectively, into and out of element holding positions in the first track means 258 and the second track means 260. The first cam 280 operates the first finger means 272 and the second cam 282 operates the second cam means 274. Specifically, in the illustrative embodiment, the finger means 272 is mounted for pivotal movement about a generally vertical axis indicated at 284 and a spring 286 is provided for yieldingly urging the finger into its element holding position. The cam 280 which has a lobe 280' rotates in the direction of the arrow 288. When the lobe 280' strikes the follower 290 on the finger means 272, the finger means pivots in the direction of the arrow 292 to release a male element 262.

The finger 274 pivots about an axis indicated at 294 and a spring 296 is provided for yieldably urging the finger means into its element holding position. The cam 282, which has a lobe 282', rotates in the direction of the arrow 298. When the lobe 282' strikes the follower portion 300 of the finger means 274, the finger means pivots in the direction of the arrow 302 to release an element 266.

Each of the cams 280, 282 is mounted on the shaft 278 to be adjustably movable relative thereto. In the illustrative embodiment, each of the cams 280, 282 is secured to an adjusted position on the shaft 288 by means of a set screw indicated at 304. Thus, since both of the cams 280, 282 are mounted on the same shaft 278, the time during each revolution of the shaft when a male element 262 will be released is determined by the adjusted position of the cam 280 and the time when the female element 266 will be released is determined by the adjusted position of the cam 282. In some cases, it may be desirable substantially simultaneously to release a male element 262 and a female element 266. In other cases, it may be desirable to release the female element 266 slightly before or slightly after the male element 262 is released. It will be remembered that it is an object of the present invention to provide feeding means which will accommodate elements of different size. The provision for adjusting the timing of the movement of the finger means 272, 274 is in keeping with this object. Further, in keeping with this object, the finger means 272 is pivotally mounted on a bracket 308 which is mounted on the first track 258 for adjustable movement as indicated by the arrow 310. In the illustrative embodiment, the bracket 308 is secured to the track means 258 by means of screws 312 which extend, respectively, through elongated slots 314, the bracket being adjustably movable within the limits of the slots. Similarly, the finger means 274 is mounted on a bracket 316 which is secured to the track means 260 by means of screws 318 which extend through, respectively, elongated slots 320 in the bracket, the bracket being adjustably movable as indicated by the arrow 322 within the limits provided by the slots 320.

Further, assuming that elements of different size will have significantly different feed rates, the preferred embodiment of the mechanism 256 will include a speed control 324 for the drive 276. Speed controls for drive motors are well known and need not be discussed, in detail, in this description.

Figures 11, 12:
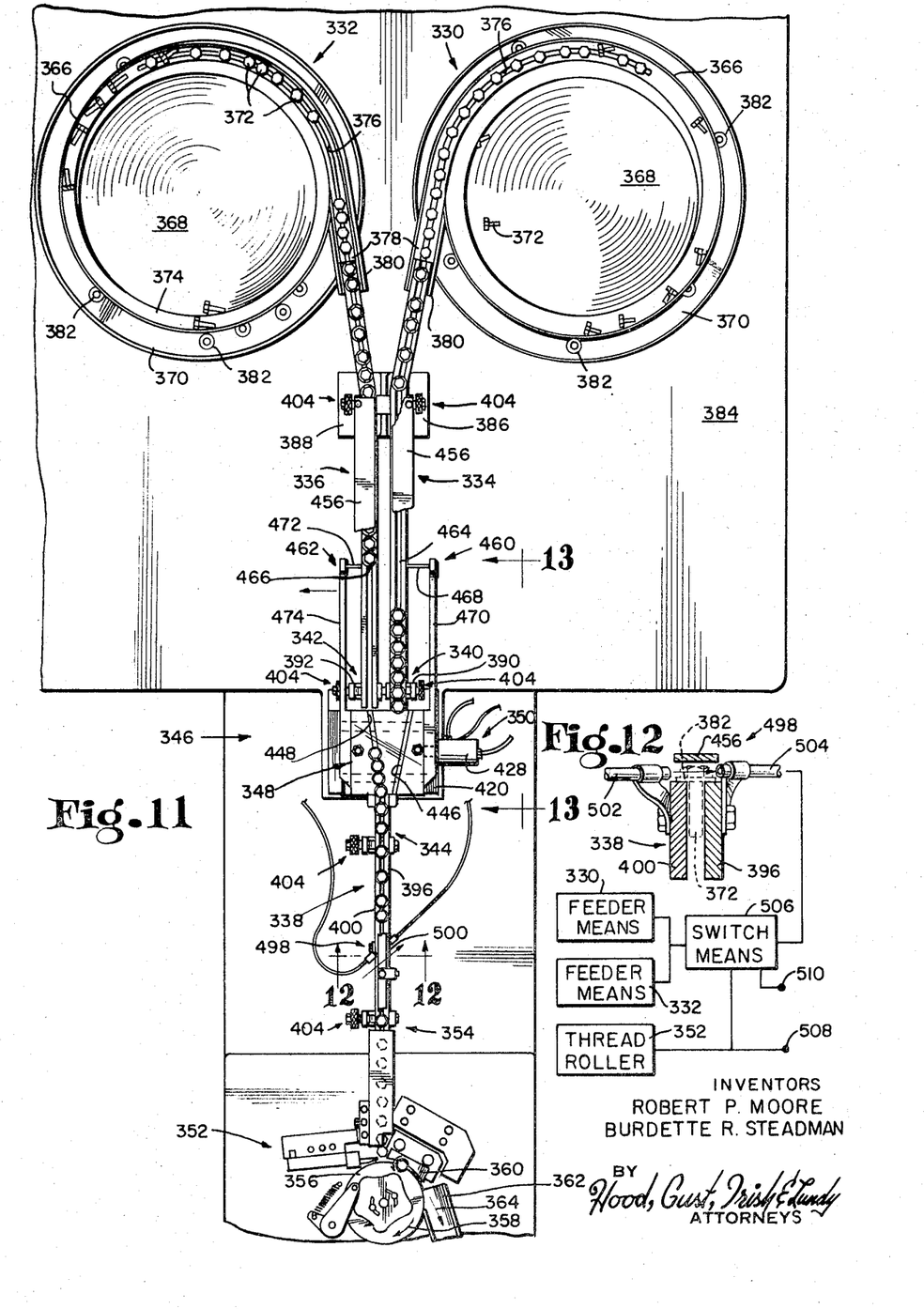
FIG. 11 is a fragmentary, plan view of a thread rolling apparatus, first and second feeder means for feeding mated screw blanks and washers, and means for alternately connecting the outputs of the feeder means to the thread rolling apparatus.
FIG. 12 is a fragmentary sectional view taken from FIG. 11 generally along the line 12—12 as well as, in block diagram form, a part of the control system for the apparatus of FIG. 11.

Referring now to FIGS. 11–16, and particularly to FIG. 11, it will be seen that there is illustrated first feeder means 330 for feeding elements, such as mated screw blanks and washers, and second feeder means 332 for feeding such elements, first track means 334 for receiving elements from the first feeder means, second track means 336 for receiving elements from the second feeder means, and third track means 338 for receiving elements from the first and second track means. Each of the first and second track means has an exit end 340, 342 and the third track means has an entrance end 344. Transfer means 346 is provided for alternately connecting the exit ends 340, 342 to the entrance end 344, the transfer means including a track mechanism 348 movable between first and second positions. The track mechanism 348 is effective, when in its first position, to convey elements from the exit end 340 to the entrance end 344 and, when in its second position, to convey elements from the exit end 342 to the entrance end 344. Means 350 is provided for driving the track mechanism 348 alternately to its first and second positions. These positions of the track mechanism 348 will be more fully discussed in conjunction with FIGS. 13, 14 and 15.

In the illustrative embodiment, a thread rolling apparatus or a thread roller 352 is connected to the exit end 354 of the third track means 338 to receive mated screw blanks and washers therefrom. This thread rolling apparatus 352 may be a conventional and well known apparatus comprising a rotary die such as indicated at 356 which rotates in the direction of the arrow 358 relative to a stationary die 360. The screw blanks and washers are fed between the rotary die 356 and stationary die 360 in a conventional manner. The rotation of the die 356 relative to the die 360 forms threads on the shanks of the screw blanks moving therebetween. The screw blanks are carried away from the dies 356, 360 in a chute 362, the direction of movement of the threaded screw blanks being indicated by the arrow 364. The structure of the thread rolling apparatus 352 is well known and need not be discussed, in detail, in this description.

Further, in the illustrative embodiment, each feeder means 330, 332 is a vibratory-type hopper bowl having an outer wall 366, the bottom of the bowl being indicated at 368, and an annular pan 370 disposed concentrically about the wall 366. Screw blanks, such as indicated at 372, are dumped onto each bottom 368 from where they move upwardly on a track 374 in a conventional manner. That is, as the feeder means 330, 332 are vibrated, screw blanks move radially outwardly on their bottoms 368 and spirally up the inclined tracks 374. The upper portion of the track 374 of each feeder means 330, 332 is slotted as indicated at 376 so that the screw blanks 372 carried thereon will be supported by their heads with their shanks extending downwardly. Each such track 374 has an exit end 378 which is conventionally disposed above and in vertical registry with a portion of a lower track 380 which receives and conveys washers such as indicated at 382. That is, a track 380 is arranged to receive and convey washers from each pan 370. The screw blanks 372 leaving the exit end 370 of each feeder 330, 332 mates with a washer carried on the track 380 of the feeder as discussed previously in this description. The mated screw blanks and washers from the feeder means 330 move to the first track means 334 while the mated screw blanks and washers from the second feeder means 332 move to the second track means 336.

The structure of the feeder means 330, 332 is now known and need not be discussed, in detail, in this description. For instance, the feeder means disclosed in the pending application Ser. No. 680,676, filed Nov. 6, 1967 by Raymond Alexander may be used in the system of FIGS. 11–16.

The feeder means 330, 332 are mounted on a frame 384.

The upper end of each track means 334, 336 is supported on the frame 384 by means of a stand 386, 388 and the lower end of each track means is supported on the frame by means of a stand 390, 392.

Figures 14, 15, 16:
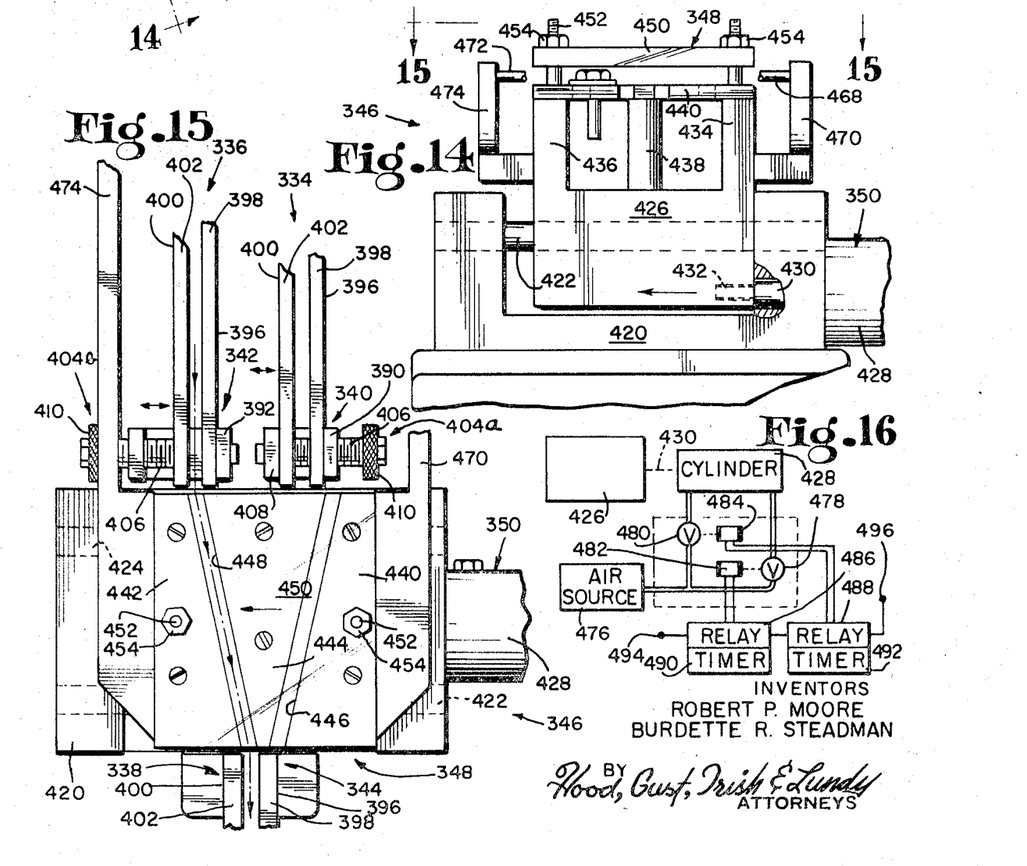
FIG. 14 is a fragmentary sectional view taken from FIG. 13 generally along the line 14—14.
FIG. 15 is a fragmentary sectional view taken from FIG. 14 generally along the line 15—15.
FIG. 16 is a block diagram of a portion of the control system for the apparatus of FIG. 11.

Each track means 334, 336, 338 is a track means for movably supporting mated screw blanks 372 and washers 382 with the head of each such screw blank resting on its mating washer and its shank extending downwardly through the center opening in the washer. Each track means 334, 336, 338 includes a first elongated bar 396 having an upper edge 398 and a second elongated bar 400 having an upper edge 402, the first and second bars being disposed generally parallel and spaced apart so that the upper edges thereof can slidably support diametrically opposite portions of such washers with the shanks of such screw blanks extending downwardly therebetween. Means is provided for mounting each such second bar 400 for selectively adjustable movement toward and away from its associated first bar 396 whereby mated screw blanks and washers of different size can be accommodated, each such mounting means being indicated generally by the reference numeral 404. Referring to FIG. 15 in which two of such mounting means 404a and 404b are best seen, it will be seen that such a mounting means 404 may comprise a threaded element 406 on which the movable second bar 400 is mounted. For instance, the threaded element 406 of the mounting means 404a for the lower exit end of the track means 334 extends through the support 390 and is engaged with a member 408 on which the second bar 400 of the track means 334 is mounted. When the element 406 is rotated in one direction, the member 408 and the bar 400 are moved away from the first bar 396 and when the element is rotated in the opposite direction the second bar and the member 408 are moved toward the first bar. Similarly, the movable bar 400 of the track means 336 is connected to its associated threaded element 406 of means 404b so that when the element is rotated in one direction the bar 400 is moved away from its mating bar 396 and when the element is rotated in the opposite direction the bar 400 is moved toward its mating bar 396. A knurled knob 410 is mounted on each threaded element 406 as illustrated.

As viewed in FIG. 15, it will be appreciated that the movable bar 400 of each track means 334, 336, 338 is the bar which is to the left and that the stationary bar 396 of each track means is the bar which is to the right. This arrangement facilitates the adjustment of the track means 334, 336, 338 relative to the track mechanism 348.

In the illustrative embodiment, the track mechanism 348 includes a frame 420 (best seen in FIGS. 13, 14 and 15) on which a pair of parallel guide bars 422, 424 is mounted and a slidable support 426 arranged for reciprocation on the bars. The drive means 350 includes an air cylinder 428, the piston 430 of which is connected to the slidable support 426 as indicated at 432 in FIG. 14.

Referring to FIG. 14, it will be seen that the slidable support 426 provides side support members 434, 436 and a central support member 438. A side plate 440 is mounted on the member 434 and a side plate 442 is mounted on the member 436. A central or center plate 444 is mounted on the central member 438. These plates 440, 442, 444 are proportioned and designed and spaced apart to provide or to define a pair of trackways 446, 448 as best seen through the preferably transparent cover plate 450 in FIG. 15. The cover plate 450 is mounted above the plates 440, 442, 444 and the trackways 446, 448 by means such as the illustrated studs 452 and nuts 454.

The air cylinder 428 is effective for reciprocating the trackways 446, 448 between first and second positions as discussed previously. Referring to FIG. 15, it will be seen that, when the support member 426 is in its right-hand position, mated screw blanks and washers can move from the exit end of the track means 336 along the trackway 448 to the entrance end of the track means 338 and, when the support 426 is in its left-hand position, mated screw blanks and washers can move from the exit end of the track means 334 along the trackway 446 to the entrance end of the track means 338. Thus, the track mechanism 348 provides trackways arranged alternately to connect the exit ends of the track means 334, 336 to the entrance end of the track means 338.

Figure 13:
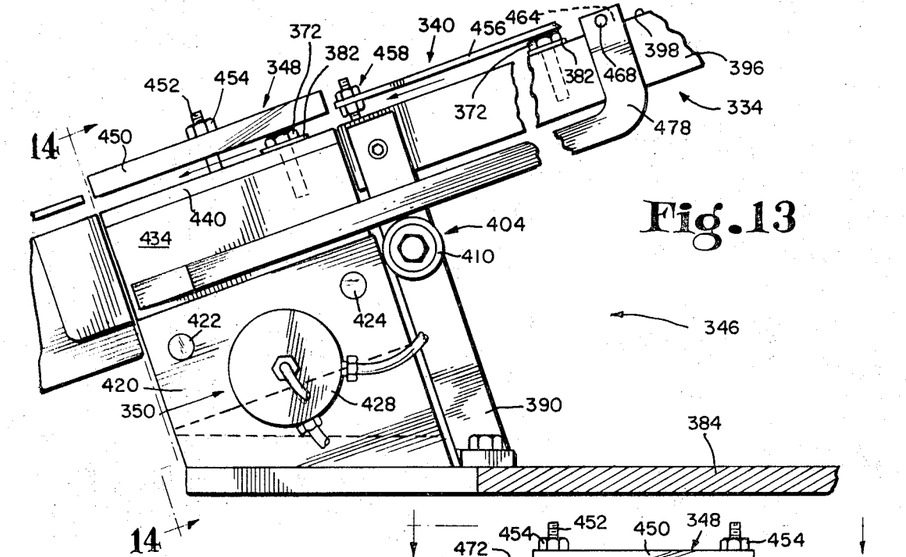
FIG. 13 is an enlarged, fragmentary sectional view taken from FIG. 11 generally along the line 13—13.

The transparent plate 450 prevents the screw blanks 372 from jumping upwardly out of the trackways 446, 448. The position of the plate 450 above the trackways is preferably adjustable so that screw blanks and washers of different size can be accommodated. As best seen in FIG. 13, with each track means 334, 336, 338, there is a cover bar or strip 456 extending above and therealong, the purpose of the bar 456 being to prevent the screw blanks from jumping or moving upwardly relative to the track means on which they are carried. These bars 456 are preferably mounted for adjustment above their respective track means by means such as indicated at 458 in FIG. 13.

Since the trackways 446 and 448 are driven relative to the track means 334, 336, 338, it is necessary to prevent a screw blank 372 and washer 380 from being in a position to be caught or damaged by movement of the trackways. That is, it is necessary to prevent such a screw blank and washer from being in a position where it is just leaving an exit end 340, 342 when the trackway 446, 448 associated with the exit end is moved. Thus, the preferred system of FIGS. 11–16 includes first means 460 for stopping downstream movement of such mated screw blanks 372 and washers 382 on the first track means 334 at a first point 464 (FIG. 11) upstream from its exit end 340 and second means 462 for stopping downstream movement of such mated screw blanks and washers on the second track means 336 at a second point 466 upstream from its exit end 342, the stopping means being connected to the drive means 350 so that, when the track mechanism 348 moves to its first position (left-hand position as viewed in FIGS. 11 and 15), the first stopping means moves into position to stop movement of such mated screw blanks and washers downstream from the point 464 and, when the track mechanism moves to its second position (right-hand position), the second stopping means 462 moves into position to stop movement of such mated screw blanks and washers downstream from the point 466.

In the illustrative embodiment, the first stop means 460 includes a stop pin 468 which is carried on a bar 470 which, in turn, is mounted on the support 426 and the second stop means 462 includes a stop pin 472 which is carried by a bar 474 which, in turn, is mounted on the support 426. Thus, the stop pins 468, 472 are drivingly connected to the cylinder 428 through the support 426. The pins 468, 472 are arranged, respectively, to reciprocate into and out of stopping positions in the track means 334, 336. As best viewed in FIG. 13, it will be seen that the stop pin 468 moves into a position at the point 464 to engage the head of a screw blank 372 and to prevent movement of mated screw blanks and washers downstream from the point 464 until the support 426 is moved to its right-hand position as viewed in FIGS. 14 and 15.

Referring to FIG. 11, it will be seen that, when the track mechanism 348 is in its right-hand position, the stop pin 472 is effective to stop movement of screw blanks and washers downstream from the point 466 and, when the mechanism is in its left-hand position, the stop pin 468 is effective to stop downstream movement of screw blanks and washers from the point 464. While the mechanism 348 is in its right-hand position, all of the screw blanks and washers downstream from the point 466 will move through the trackway 448 and onto the third track means 338 while, at the same time, mated screw blanks and washers move downstream on the first track means 334 to its exit end 340. Then, when the track mechanism 348 moves to its left-hand position, those mated screw blanks and washers collected on the first track means 334 downstream from the point 464 will move through the trackway 446 to the third track means 338 while, at the same time, mated screw blanks and washers will move along the second track means 336 to its exit end 342.

In order to assure that the track mechanism 348 will stay in each of its two positions an amount of time sufficient to permit the necessary number of mated screw blanks and washers to pass therethrough, the drive means 350 is controlled by timer means as will be discussed hereinafter. That is, the track mechanism 348 is held in its right-hand position for a predetermined time which is sufficient to permit all mated screw blanks and washers downstream from the point 466 to move through the trackway 448 and then the mechanism is held in its left-hand position for a period of time which is sufficient to permit all of the mated screw blanks and washers downstream from the point 464 to move through the trackway 446.

Referring to FIG. 16, the manner in which the movement of the support 426 may be controlled will be discussed. An air source indicated at 476 is connected through a valve 478 to one end of the cylinder 428 and through another valve 480 to the opposite end of the cylinder 428. It will be appreciated that, when the valve 478 is open, the support 426 is driven to its left-hand position (FIG. 15) and that, when the valve 480 is open, the support 426 is driven to its right-hand position. Each of these valves 478, 480 is operated by a solenoid 482, 484 which, in turn, is dominated by a relay 486, 488. Each relay 486, 488 is, in turn, dominated by a timer or a timer means 490, 492. The valves 478, 480, relays 486, 488, solenoids 482, 484 and timers 490, 492 are conventional and need not be discussed, in detail, in this description. Preferably, each of the timers 490, 492 is adjustable so as to operate its associated relay 486, 488 for selected time periods. That is, the timer 490 is preferably adjustable so that the valve 478 will be held open to hold the support 426 in its left-hand position for a predetermined period of time and the timer 492 is preferably adjustable so that the valve 480 will be held open to hold the support 426 in its right-hand position for a predetermined period of time. The relays 486, 488 may be connected together in some conventional fashion so that the cylinder 428 will continue alternately to move the support 426 for the trackways 446, 448 between its two positions, the trackways staying in each of their two positions for periods of time determined, respectively, by the timers 490, 492.

As illustrated, an input signal terminal 494, 496 may be connected to each relay 486, 488 and used for reasons which will be discussed hereinafter.

The thread rolling apparatus 352 as well as the feeder means 330, 332 and, of course, the control means for the drive means 350 are electrically operated. That is, the rotary die 356 of the thread rolling apparatus 352 is driven by an electric motor and each of the feeder means 330, 332 is driven by an electro-magnetic vibrator. The control means for the system of FIGS. 11–16, preferably includes sensing means 498 disposed at an intermediate point 500 upstream from the exit end 354 of the third track means 338, the sensing means being arranged to provide a predetermined output when mated screw blanks 372 and washers 382 cannot move downstream from the said intermediate point 500. It will be appreciated that, when mated screw blanks 372 and washers 382 cannot move downstream from the point 500, the portion of the third track means 338 above that point will fill up with mated screw blanks and washers so that such screw blanks and washers cannot move through the trackways 446, 448. In such a condition, reciprocation of the trackways will be interfered with. Thus, the output of the sensing means 498 is used to de-energize the feeder means 330, 332 and, preferably, also to de-energize the drive means 350. The thread rolling apparatus 352 will continue to operate so that the third track means 338 can be emptied of mated screw blanks 372 and washers 382.

Referring now to FIG. 12, the manner in which the sensing means 498 is used will be discussed. The sensing means 498 comprises a tube 502 arranged to direct air at another tube 504, the tubes being disposed on opposite sides of the point 500 of the track means 338 is illustrated.

In such a conventional sensing means 498, the tube 504 is connected to a switch means 506. This switch means is a part of the sensing means 498 in that it senses the absence of air flow to the tube 504 for a predetermined period of time and electrically changes state. The feeder means 330, 332 are energized by current flow from a terminal 508 through the switch means as indicated. Thus, when the air flow to the tube 504 is blocked for a predetermined period of time, the switch means 506 is operated to de-energize the feeder means 330, 332. The thread roller 352 is energized directly from the terminal point 508. The switch means 506 is also preferably provided with an output 510 which preferably is connected to the input terminals 494, 496 (FIG. 16) of the relays 486, 488 so that when the switch means 506 is operated, the relays will be operated to prevent movement of the trackways 446, 448.

The system of FIGS. 11–16 is preferably constructed so that its various parts can be adjusted to handle screw blanks and washers of different size. For instance, each of the feeder means 330, 332 may include a feeder bowl such as illustrated and discussed in conjunction with FIGS. 3–7. Further, it will be appreciated that each feeder means 330, 332 may be replaced by a feeder means such as illustrated and discussed in conjunction with FIGS. 1 and 2.

Figures 17, 18, 19:
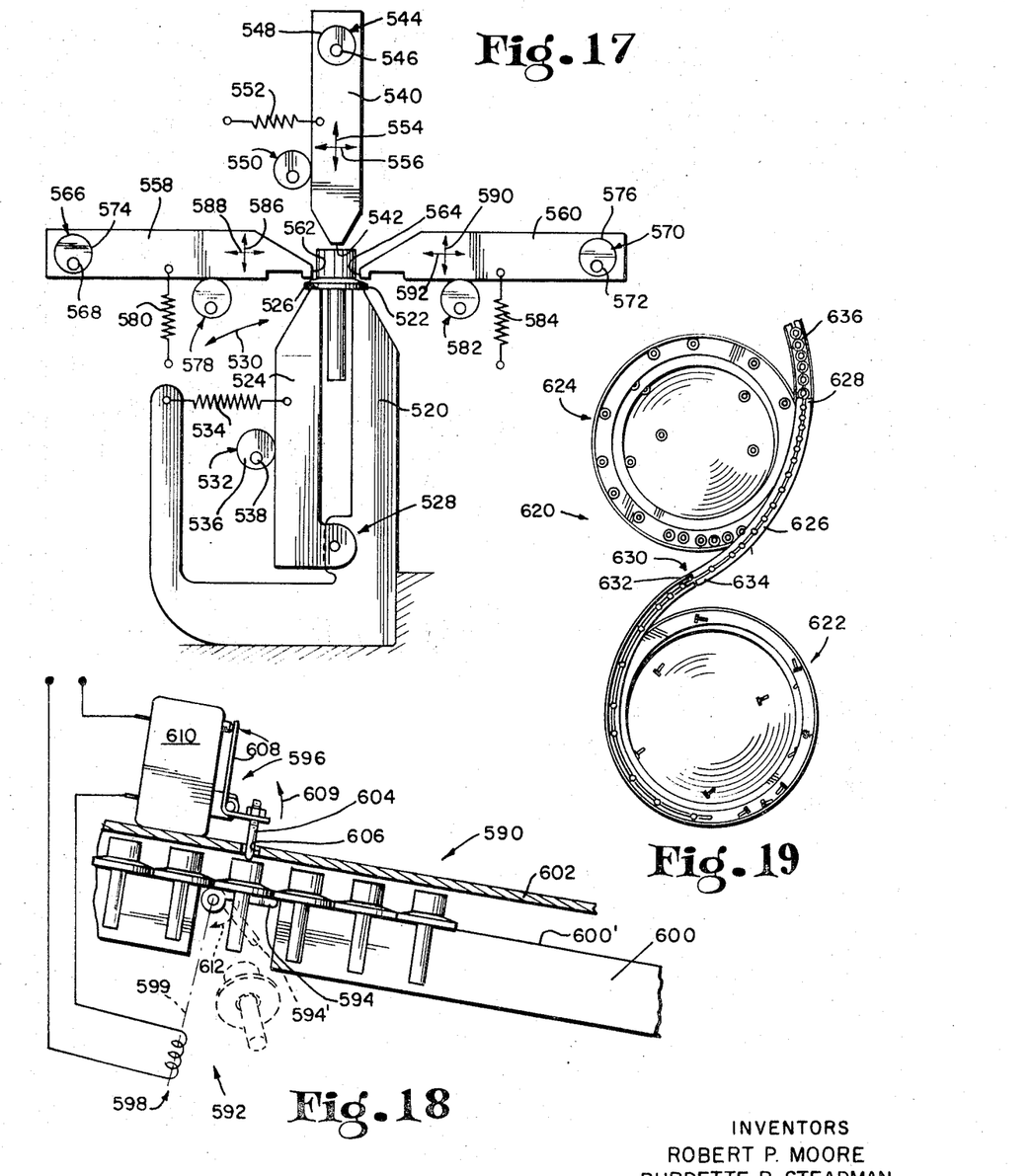
FIG. 17 is an end view, somewhat diagrammatical, of a track means which can be easily adjusted to accommodate mated screw blanks and washers of different sizes.
FIG. 18 is a somewhat diagrammatical view of a portion of a track means and means for dropping imperfectly mated screw blanks and washers off the track means.
FIG. 19 is a fragmentary plan view of a bowl for feeding screw blanks and a bowl for feeding washers with track means arranged so that the screw blanks are fed to a track carried by the bowl which feeds the washers.

Referring now to FIG. 17, a track means for movably supporting mated screw blanks and washers with the head of each such screw blank resting on its mating washer and its shank extending downwardly through the center opening in the washer will be discussed. There is illustrated, in FIG. 17, an end view of such a track means. That is, in FIG. 17, we see only the ends of a plurality of elongated parallel bars, the edges and edge portions of which define a trackway for conveying mated screw blanks and washers.

The track means of FIG. 17 comprises a first elongated bar 520 having an upper edge 522 and a second elongated bar 524 having an upper edge 526, the first and second bars being disposed generally parallel and spaced apart so that their upper edges can slidably support diametrically opposite portions of washers with the shanks of screw blanks extending downwardly between the bars. Means, indicated at 528, is provided for mounting the second bar 524 for selectively adjustable movement toward and away from the first bar 520, whereby mated screw blanks and washers of different size can be accommodated.

The mounting means 528 provides for pivotal movement of the second bar 524 about a first axis which is parallel to the first bar 520 and spaced below its upper edge, this pivotal movement being indicated by the arrow 530.

First cam means 532 is provided for selectively and adjustably positioning the second bar 524 about the first axis provided by means 528 to determine the spacing between the first and second bars 520, 524. Spring means 534 is provided for yieldably urging the second bar 524 against the first cam means 532. In the illustrative embodiment, the cam means 523 comprises a cam 536 which is mounted for selectively adjustable movement about a trunnion 538.

The spring means 534 is a means for yieldably urging the second track 524 in one direction about the axis provided by the means 528 and the cam means 532 is means for selectively and adjustably positioning the second bar 524 in opposition to the spring means 534.

The track means of FIG. 17 further includes a third elongated bar 540 having a lower edge 542 disposed above the upper edges 522, 526, this lower edge 542 being effective to prevent significant movement of mated screw blanks and washers upwardly relative to the first and second bars 520, 524. The third bar 540 is generally parallel to the first and second bars 520, 524. First eccentric means 544 is disposed for selectively adjustable rotation about an axis provided by the trunnion 546 which is parallel to and above the axis provided by the means 528. The third bar 540 is carried by the first eccentric means 544 so that the position of the lower edge 542 relative to the upper edges 522, 526 can be adjusted by adjusting the first eccentric means. In the illustrative embodiment, the first eccentric means 544 is provided with a bearing surface 548 on which the third bar 540 is mounted for rocking movement. Cam means 550, similar to the cam means 532, is provided for selectively and adjustably positioning the third bar 540 about the eccentric means 544, thereby laterally to position the lower edge 542 relative to the upper edges 522, 526. Spring means indicated at 552 is arranged to urge the third bar 540 against the cam means 550. Thus, the third bar 540 is adjustably movable vertically as indicated by the arrow 554 and laterally or horizontally as indicated by the arrow 556 so that its lower edge 542 can be properly positioned relative to the upper edges 522, 526.

The track means of FIG. 17 further includes fourth and fifth elongated bars 558, 560 extending generally parallel to the first and second bars 520, 524, the fourth bar 558 providing an edge portion 562 extending above and along the upper edge 526 and below the lower edge 542 and the fifth bar 560 providing an edge portion 564 extending above and along the upper edge 522 and below the lower edge 542. The purpose of these edge portions 562, 564 is to define a slot for for guiding movement of the heads of screw blanks as well as to prevent movement of the washers upwardly off the upper edges 522, 526.

Second eccentric means 566 is disposed for selectively adjustable rotation about an axis 568 which is generally parallel to the axis provided by the means 528, the fourth bar 558 being carried by the second eccentric means 566 so that the position of its edge portion 562 relative to the upper edge 526 can be adjusted by adjusting the second eccentric means. Similarly, third eccentric means 570 is disposed for selectively adjustable rotation about an axis 572 generally parallel to the axis provided by the means 528 and the fifth bar 560 is carried by the third eccentric means so that the position of its edge portion 564 relative to the upper edge 522 can be adjusted by adjusting the third eccentric means.

The second eccentric means 566 provides a bearing surface 574 on which the fourth bar 558 is mounted for rocking movement and the third eccentric means 570 provides a bearing surface 576 on which the fifth bar 560 is mounted for rocking movement. Cam means 578 is provided for selectively and adjustably positioning the fourth bar 558 about the second eccentric means 566, thereby vertically to position the edge portion 562 relative to the upper edge 526. Spring means 580 is provided for yieldably urging the fourth bar against the cam means 578. Other cam means 582 is provided for selectively and adjustably positioning the fifth bar 560 about the the third eccentric means 570, thereby vertically to position the edge portion 564 relative to the edge 522. Spring means 584 is provided for yieldably urging the fifth bar 560 against the cam means 582.

It will be appreciated, therefore, that the edge portion 562 can be adjusted vertically as indicated by the arrow 586 and laterally or horizontally as indicated by the arrow 588 while the edge portion 564 can be adjusted vertically as indicated by the arrow 590 and laterally or horizontally as indicated by the arrow 592. Specifically, each of the bars 524, 540, 558, 560 is mounted for adjustable movement pivotally about an axis which is parallel to the upper edge 522 of the stationary bar 520. Each of these bars 524, 540, 558, 560 is urged by means of a spring to its operative position and means, such as a cam, provided for moving the bar in opposition to its spring to a selected position. Each of the bars 540, 558, 560 is preferably carried by an eccentric, the eccentric being selectively and adjustably rotatable about an axis which is also parallel with the upper edge 522 of the stationary bar 520.

Referring now to FIG. 18, it will be seen that there is illustrated a portion of a track means 590 including, at a point intermediate its ends, means 592 for dropping out screw blanks and washers which are imperfectly mated. The dropping out means 592 includes a track portion 594 on which such mated screw blanks and washers are supported for movement, the track portion being mounted on the track means 590 for movement to a position 594' effective to drop out any mated screw blank and washer supported thereon. Means 596 is provided for sensing such imperfectly mated screw blanks and washers at the said intermediate point and electrically-operated means 598 is provided for moving the track portion 594 to its position 594', the electrically-operated means 598 being responsive to and dominated by the sensing means 596. As discussed previously, the track means 590 includes a pair of parallel bars for slidably supporting mated screw blanks and washers, only one bar 600 having upper edge 600' being illustrated. There is a cover strip or bar 602 disposed above the bars on which the mated screw blanks and washers are movably supported, the purpose of the bar 602 being to prevent movement of the screw blanks and washers upwardly. The sensing means 596 comprises a sensing pin 604 which extends downwardly through an opening 606 in the bar 602 to engage the heads of mated screw blanks and washers moving thereunder. The pin 604 is carried by a lever 608 arranged to operate a conventional micro-switch 610. That is, if, for some reason, a screw blank and washer are imperfectly mated, and, therefore, the head of the screw blank is abnormally too high, the lever 608 will pivot in the direction of the arrow 609 to operate the switch 610. The electrically-operated means 598 may be a conventional solenoid which is operatively connected to the track portion 594 as indicated at 599. The switch 610 merely energizes the solenoid 598 to cause it to pivot the track portion 594 in the direction of the arrow 612. Any screw blank and washer supported on the track portion 594 at the time it is so pivoted, will fall off.

The purpose of the dropping out means 592 is to prevent improperly mated screw blanks and washers from being fed to the thread forming apparatus. Thus, such a dropping out means can ideally be placed intermediate the ends of the third track means 338 discussed in conjunction with FIGS. 11–16. The sensing means 596 for sensing such imperfectly mated screw blanks and washers is merely illustrative and it will be appreciated that any number of types of sensing means may be used to determine when a screw blank and washer are improperly mated. In most cases, it has been found that, when a screw blank and washer are improperly mated, the combined height of the screw blank head and washer will be abnormally above or abnormally below a desired level. Thus, the pin 604 acts as a feeler gauge to determine the height of the heads of mated screw blanks and washers.

Referring now to FIG. 19, a feeder means, indicated generally by the reference numeral 620, comprising a first vibratory-type feeder bowl 622 for feeding screw blanks and a second vibratory-type feeder bowl 624 for feeding washers will be discussed. The structures of the bowls 622, 624 and the manner in which they operate is conventional and need not be discussed, in detail, in this description. That is, screw blanks are dumped into the bowl 622 and washers are dumped into the bowl 624. When the bowls 622, 624 are vibrated, screw blanks are serially oriented and fed from the bowl 622 while washers are serially oriented and fed from the bowl 624.

A first track 626 is provided for receiving and conveying screw blanks from the first bowl 622, this first track having an exit end as indicated at 628. The first track 626 is formed to have an arcuate portion terminating at its exit end 628 and it is generally concentrically mounted on the outer periphery of the second bowl 624. That is, the first track 626 is mounted on the second bowl 624 for vibratory movement therewith.

It will be seen that there is a break indicated at 630 between the track 632 which is the delivery track for the first bowl 622 and the entrance end 634 of the first track 626. That is, the track 632 is an integral portion of the bowl 622 and vibrates with the bowl while the first track 626 is mounted for vibration with the bowl 624. The break 630 is such that screw blanks leaving the track 632 will move on to the entrance end 634 of the first track 626.

A second track 636 for conveying washers from the second bowl 624 is mounted on the second bowl for vibratory movement therewith, this second track having an arcuately formed portion generally concentric with the second bowl and disposed below and in vertical registry with the exit end 628 of the first track 626. Thus, screw blanks leaving the exit end 628 mate with washers carried on the second track 636.

The feeder means 620 thus utilizes a pair of feeder bowls 622, 624 with the first bowl 622 being arranged to feed screw blanks to a track 626 which is mounted on the second bowl 624 for vibratory movement therewith.

What is claimed is:

1. An apparatus of the character described comprising first feeder means for feeding mated screw blanks and washers, second feeder means for feeding mated screw blanks and washers, first track means for receiving mated screw blanks and washers from said first feeding means, second track means for receiving mated screw blanks and washers from said second feeding means, third track means for receiving mated screw blanks and washers from said first and second track means, each of said first and second track means having an exit end, said third track means having an entrance end, transfer means for alternately connecting said exit ends to said entrance end, said transfer means including a track mechanism movable between first and second positions, said mechanism being effective, when in its said first position, to convey mated screw blanks and washers from the exit end of said first track means to the entrance end of said third track means and, when in its said second position, to convey mated screw blanks and washers from the exit end of said second track means to the entrance end of said third track means, and means for driving said mechanism alternately to its said first and second positions, and thread forming means for receiving mated screw blanks and washers from said third track means, said thread forming means being effective to form threads on the shanks of such screw blanks, thereby to secure the washers mated therewith.

2. The apparatus of claim 1 including first means for stopping downstream movement of such mated screw blanks and washers on said first track means at a first point upstream from its exit end and second means for stopping downstream movement of such mated screw blanks and washers on said second track means at a second point upstream from its exit end, said stopping means being connected to said drive means and arranged so that, when said track mechanism moves to its first position, said first stopping means moves into position to stop movement of such mated screw blanks and washers downstream from said first point toward said track mechanism and, when said track mechanism moves to its second position, said second stopping means moves into position to stop movement of such mated screw blanks and washers downstream from said second point toward said track mechanism.

3. The apparatus of claim 1 in which said track mechanism provides first and second trackways, said first trackway being disposed, when said mechanism is in its first position, to convey such mated screw blanks and washers from the exit end of said first track means to the entrance end of said third track means and said second trackway being disposed, when said mechanism is in its second position, to convey such mated screw blanks and washers from the exit end of said second track means to the entrance end of said third track means.

4. The apparatus of claim 3 including a first stop pin connected to said mechanism and arranged, when said mechanism is in its first position, to extend into said first track means at a point upstream from its exit end to stop movement of such mated screw blanks and washers downstream from said point, and a second stop pin carried by said mechanism and arranged, when said mechanism is in its second position, to extend into said second track means at a point upstream from its exit end to stop movement of such mated screw blanks and washers downstream from the last-said point.

5. The apparatus of claim 3 in which said driving means includes a fluid motor, and including control means for said driving means, said control means including electrically-operated valve means dominating said fluid motor and timer means dominating said valve means, said timer means being effective to establish the amount of time during which said track mechanism will stay in each of its said first and second positions.

6. The apparatus of claim 1 in which said feeder means and said thread forming means are electrically driven, and including means for controlling energization of said feeder means and forming means, said control means including sensing means disposed at an intermediate point upstream from the exit end of said third track means, said sensing means being arranged to provide a predetermined output when mated screw blanks and washers cannot move downstream from said intermediate point, and switch means for de-energizing said feeder means, said switch means being responsive to and dominated by said sensing means, whereby said feeder means are de-energized when mated screw blanks and washers cannot move downstream from said intermediate point.

7. The appartaus of claim 6 in which said switch means is also arranged to de-energize said drive means, whereby said track mechanism is held stationary when mated screw blanks and washers cannot move downstream from said point.

8. The apparatus of claim 4 in which said feeder means and said thread forming means are electrically driven, and including means for controlling energization of said feeder means and forming means, said control means including sensing means disposed at an intermediate point upstream from the exit end of said third track means, said sensing means being arranged to provide a predetermined output when mated screw blanks and washers cannot move downstream from said intermediate point, and switch means for de-energizing said feeder means, said switch means being responsive to and dominated by said sensing means, whereby said feeder means are de-energized when mated screw blanks and washer cannot move downstream from said intermediate point.

9. The apparatus of claim 8 in which said switch means is also arranged to de-energize said drive means, whereby said track mechanism is held stationary when mated screw blanks and washers cannot move downstream from said point.

10. The apparatus of claim 3 in which said track mechanism is mounted for reciprocation between its first and second positions and in which said driving means includes a double-acting, reciprocable fluid motor drivingly connected to said mechanism.

11. The apparatus of claim 1 in which each of said track means includes a first elongated bar having an upper edge and a second elongated bar having an upper edge, said bars being disposed generally parallel so that the upper edges thereof can slidably support diametrically opposite portions of washers through which the shanks of such screw blanks extend with the heads of such screw blanks resting on such washers, and means supporting said second bar for selectively adjustable movement toward and away from said first bar, whereby mated screw blanks and washers of different size can be accommodated.

12. The apparatus of claim 1 in which each of said track means includes a first elongated bar having an upper edge, a second elongated bar having an upper edge, means mounting said second bar for pivotal movement about a first axis parallel to said first bar and spaced below its upper edge, said bars being generally parallel, first cam means for selectively and adjustably positioning said second bar about said first axis to determine the spacing between said bars, and first spring means for yieldably urging said second bar against said first cam means.

13. The apparatus of claim 12 in which each track means further includes a third elongated bar having a lower edge disposed above said upper edges, said third bar being generally parallel to said first and second bars, and first eccentric means disposed for selectively adjustable rotation about an axis generally parallel to and above said first axis, said third bar being carried by said first eccentric means, whereby the position of said lower edge relative to said upper edges can be adjusted by adjusting said first eccentric means.

14. The apparatus of claim 13 in which each track means further includes second cam means for selectively and adjustably positioning said third bar about said first eccentric means, thereby laterally to position said lower edge relative to said upper edges, and second spring means for yieldably urging said third bar against said second cam means.

15. The apparatus of claim 14 in which each track means further includes fourth and fifth elongated bars parallel to said first and second bars, said fourth bar providing an edge portion extending above and along the upper edge of said second bar and below the lower edge of said third bar, and said fifth bar providing an edge portion extending above and along the upper edge of said first bar and below the lower edge of said third bar, second eccentric means disposed for selectively adjustable rotation about an axis generally parallel to said first axis, said fourth bar being carried by said second eccentric means, whereby the position of the edge portion of said fourth bar relative to the upper edge of said second bar can be adjusted by adjusting said second eccentric means, and third eccentric means disposed for selectively adjustable rotation about an axis generally parallel to said first axis, said fifth bar being carried by said third eccentric means, whereby the position of the edge portion of said fifth bar relative to the upper edge of said first bar can be adjusted by adjusting said third eccentric means.

16. The apparatus of claim 15 in which each track means further includes third cam means for selectively and adjustably positioning said fourth bar about said second eccentric means, thereby vertically to position the edge portion of said fourth bar relative to the upper edge of said second bar, third spring means for yieldably urging said fourth bar against said third cam means, fourth cam means for selectively and adjustably positioning said fifth bar about said third eccentric means, thereby vertically to position the edge portion of said fifth bar relative to the upper edge of said first bar, and fourth spring means for yieldably urging said fifth bar against said fourth cam means.

17. The apparatus of claim 1 in which said third track means includes, at a point intermediate its ends, means for dropping out screw blanks and washers which are imperfectly mated, said dropping out means including a track portion on which said mated screw blanks and washers are supported for movement, said track portion being mounted on said third track means for movement to a position effective to drop out any mated screw blank and washer supported thereon, means for sensing such imperfectly mated screw blanks and washers at said intermediate point, and electrically-operated means for moving said track portion to its said position, said electrically-operated means being responsive to and dominated by said sensing means.

18. The apparatus of claim 1 in which each of said feeder means comprises a first feeder bowl for feeding screw blanks, a second feeder bowl for feeding washers, each of such screw blanks being proportioned and designed for mating engagement with any one of such washers, a first track for receiving and conveying screw blanks from said first feeder bowl, a second track for receiving and conveying washers from said second feeder bowl, said first track having an exit and disposed above and in registry with a portion of said second track so that screw blanks on said first track will be in mating relationship with washers carried on said second track, whereby screw blanks leaving the exit end of said first track will be mated with washers on said second track and such mated screw blanks and washers will be supported for movement along said second track.

19. The apparatus of claim 18 including first means for vibrating said first track to move such screw blanks therealong and second means for vibrating said second track to move such washers therealong.

20. The apparatus of claim 1 in which each of said feeder means comprises a first feeder bowl for feeding screw blanks, a second feeder bowl for feeding washers, each of such screw blanks being proportioned and designed for mating engagement with any such washer, a first track for receiving and conveying screw blanks from said first feeder bowl, said first track having an exit end, said first track also having a portion terminating at its exit end which is arcuately formed and generally concentrically mounted on the outer periphery of said second feeder bowl, whereby said first track is mounted for vibratory movement with said second feeder bowl, and a second track for conveying washers from said second feeder bowl, said second track being mounted on said second feeder bowl for vibratory movement therewith, said second track also having an arcuately formed portion generally concentric with said second feeder bowl and disposed below and in vertical registry with the exit end of said first track, whereby screw blanks leaving the exit end of said first track will mate with washers carrier on said second track.

21. The apparatus of claim 1 in which each feeder means comprises a feeder bowl having a bottom for receiving screw blanks, a track disposed about the upper periphery of said bowl, a generally spirally inclining track for conveying such screw blanks upwardly from said bottom to said first-named track, said first named track having a first portion extending peripherally about a portion of said bowl, said first portion inclining downwardly from its radially inner edge to its radially outer edge whereby such screw blanks tend to move radially outwardly thereon, and skirt means disposed peripherally about a portion of said bowl and above said first portion of said first named track, said skirt means providing a lower peripherally extending edge spaced above said first portion and disposed radially inwardly from the radially outer edge of said first portion, the distance between said lower edge and said first portion being such that a portion of the head of each such screw blank is engaged by said lower edge while the shank of such screw blank extends generally radially outwardly thereunder.

22. An apparatus of the character described comprising first feeder means for feeding mated screw blanks and washers, second feeder means for feeding mated screw blanks and washers, first track means for receiving mated screw blanks and washers from said first feeder means, second track means for receiving mated screw blanks and washers from said second feeder means, third track means for receiving mated screw blanks and washers from said first and second track means, each of said first and second track means having an exit end, said third track means having an entrance end, transfer means for operatively connecting said exit ends to said entrance end, said trasfer means including a track mechanism effective, when in a first condition, to permit conveyance of mated screw blanks and washers from the exit end of said first track means to the entrance end of said third track means and, when in a second condition, to permit conveyance of mated screw blanks and washers from the exit end of said second track means to the entrance end of said third track means, and means for switching said mechanism alternately to its first and second conditions, and thread forming means for receiving mated screw blanks and washers from said third track means, said thread forming means being effective to form threads on the shanks of such screw blanks, thereby to secure the washers mated therewith.

References Cited

UNITED STATES PATENTS

| | | | |
|---|---|---|---|
| 2,985,900 | 5/1961 | Nouvelet | 10—155 |
| 3,162,874 | 12/1964 | Autio | 10—155 |
| 3,212,114 | 10/1965 | Pipes | 10—155 |

RICHARD J. HERBST, Primary Examiner

E. M. COMBS, Assistant Examiner

U.S. Cl. X.R.

10—155